US010942840B2

(12) United States Patent
Reddy et al.

(10) Patent No.: US 10,942,840 B2
(45) Date of Patent: Mar. 9, 2021

(54) SYSTEM AND METHOD FOR MANAGING A CODE REPOSITORY

(71) Applicant: EMC IP Holding Company LLC, Hopkinton, MA (US)

(72) Inventors: Venkat Mattapalli Reddy, Bangalore (IN); Gayatri Singh Balaji, Bangalore (IN); Debra J. Robitaille, Hopkinton, MA (US); Mark Adam Arakelian, Shirley, MA (US); Belagapu Pradeep Kumar, Bengaluru (IN); Santosh Govindrao Bhandiwad, Bangalore (IN); Sindhura Chamala, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/399,968

(22) Filed: Apr. 30, 2019

(65) Prior Publication Data

US 2020/0349055 A1 Nov. 5, 2020

(51) Int. Cl.
G06F 11/36 (2006.01)
G06F 3/0484 (2013.01)
G06F 8/30 (2018.01)
G06F 8/71 (2018.01)

(52) U.S. Cl.
CPC ...... *G06F 11/3664* (2013.01); *G06F 3/04842* (2013.01); *G06F 8/30* (2013.01); *G06F 8/71* (2013.01); *G06F 11/3684* (2013.01); *G06F 11/3688* (2013.01)

(58) Field of Classification Search
CPC .... G06F 8/71; G06F 11/3664; G06F 11/3688; G06F 8/30; G06F 11/3684; G06F 3/04842
USPC .................................................. 717/124–161
See application file for complete search history.

(56) References Cited

U.S. PATENT DOCUMENTS

| 10,372,585 | B2 * | 8/2019 | Dunn | G06F 11/3608 |
| 10,467,220 | B2 * | 11/2019 | Li | G06F 11/3676 |
| 10,613,970 | B1 * | 4/2020 | Jammula | G06F 11/3684 |
| 2013/0097586 | A1 * | 4/2013 | Chandra | G06F 11/3684 717/124 |

(Continued)

*Primary Examiner* — Marina Lee
(74) *Attorney, Agent, or Firm* — Chamberlain, Hrdlicka, White, Williams & Aughtry

(57) ABSTRACT

A data processing device includes persistent storage and a software development manager. The persistent storage stores a code repository. The software development manager generates commit impact information based on: pre-commit code for a code base stored in the code repository, and dependency data based on committed code of the code base; displays a pre-commit analysis graphic user interface (GUI) reflecting the commit impact information and testing information for the pre-commit code; obtains, using the displayed pre-commit analysis GUI, reviewer feedback regarding approval of the pre-commit code; makes a determination, based on the reviewer feedback, that the pre-commit code has been approved; in response to the determination: performs limited testing of the code base based upon the dependency data to obtain testing results; and commits the pre-commit code to the committed code when the testing results match a predetermined behavior.

20 Claims, 15 Drawing Sheets

(56) References Cited

U.S. PATENT DOCUMENTS

| | | | |
|---|---|---|---|
| 2015/0095619 A1* | 4/2015 | Dubey | G06F 11/3688 |
| | | | 712/216 |
| 2015/0205600 A1* | 7/2015 | Grillo | H04L 67/06 |
| | | | 717/101 |
| 2015/0347126 A1* | 12/2015 | Tibble | G06F 8/70 |
| | | | 717/132 |
| 2015/0378724 A1* | 12/2015 | Balachandran | G06F 8/75 |
| | | | 717/123 |
| 2016/0239295 A1* | 8/2016 | Kolesnik | G06F 8/30 |
| 2016/0246838 A1* | 8/2016 | Li | G06F 11/3684 |
| 2016/0306613 A1* | 10/2016 | Busi | G06F 8/36 |
| 2017/0091078 A1* | 3/2017 | Atyam | G06F 11/3672 |
| 2019/0026697 A1* | 1/2019 | Burton | G06Q 10/103 |
| 2019/0138426 A1* | 5/2019 | Dunn | G06F 11/3664 |
| 2019/0235988 A1* | 8/2019 | Janjua | G06F 21/562 |
| 2019/0317754 A1* | 10/2019 | Mosquera | H04L 41/5003 |
| 2020/0081814 A1* | 3/2020 | Srinivasan | G06F 8/71 |
| 2020/0142693 A1* | 5/2020 | Neugschwandtner | G06F 8/77 |

\* cited by examiner

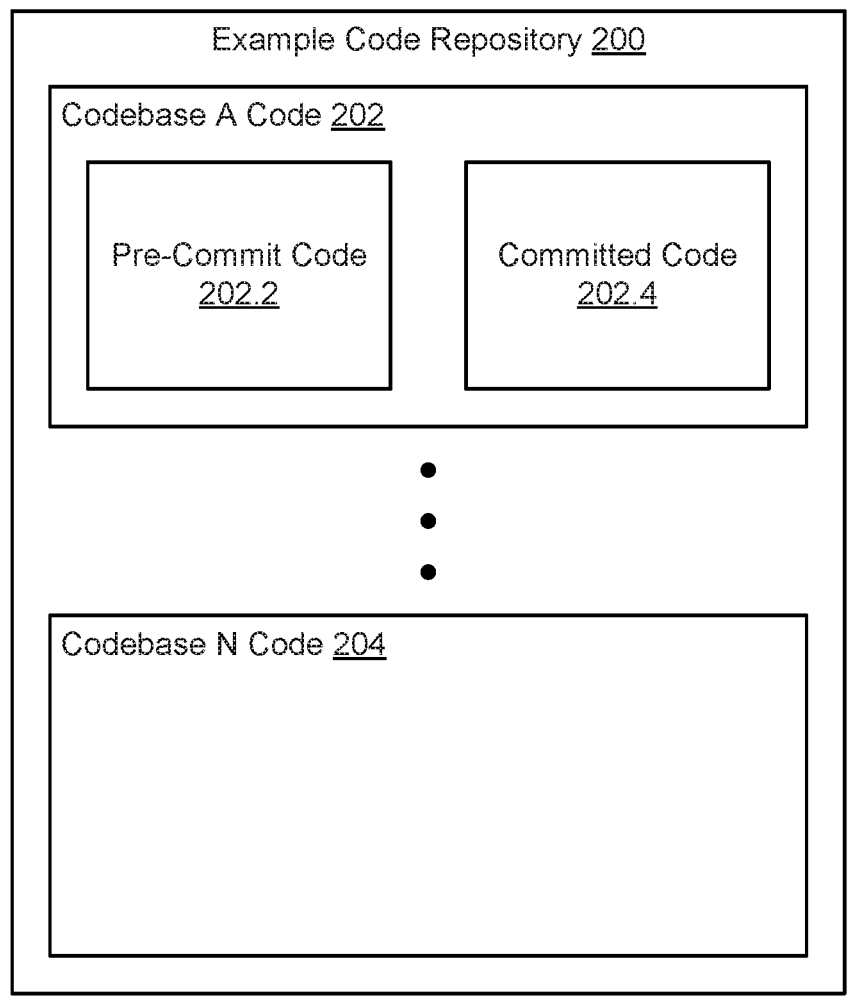
FIG. 2.1

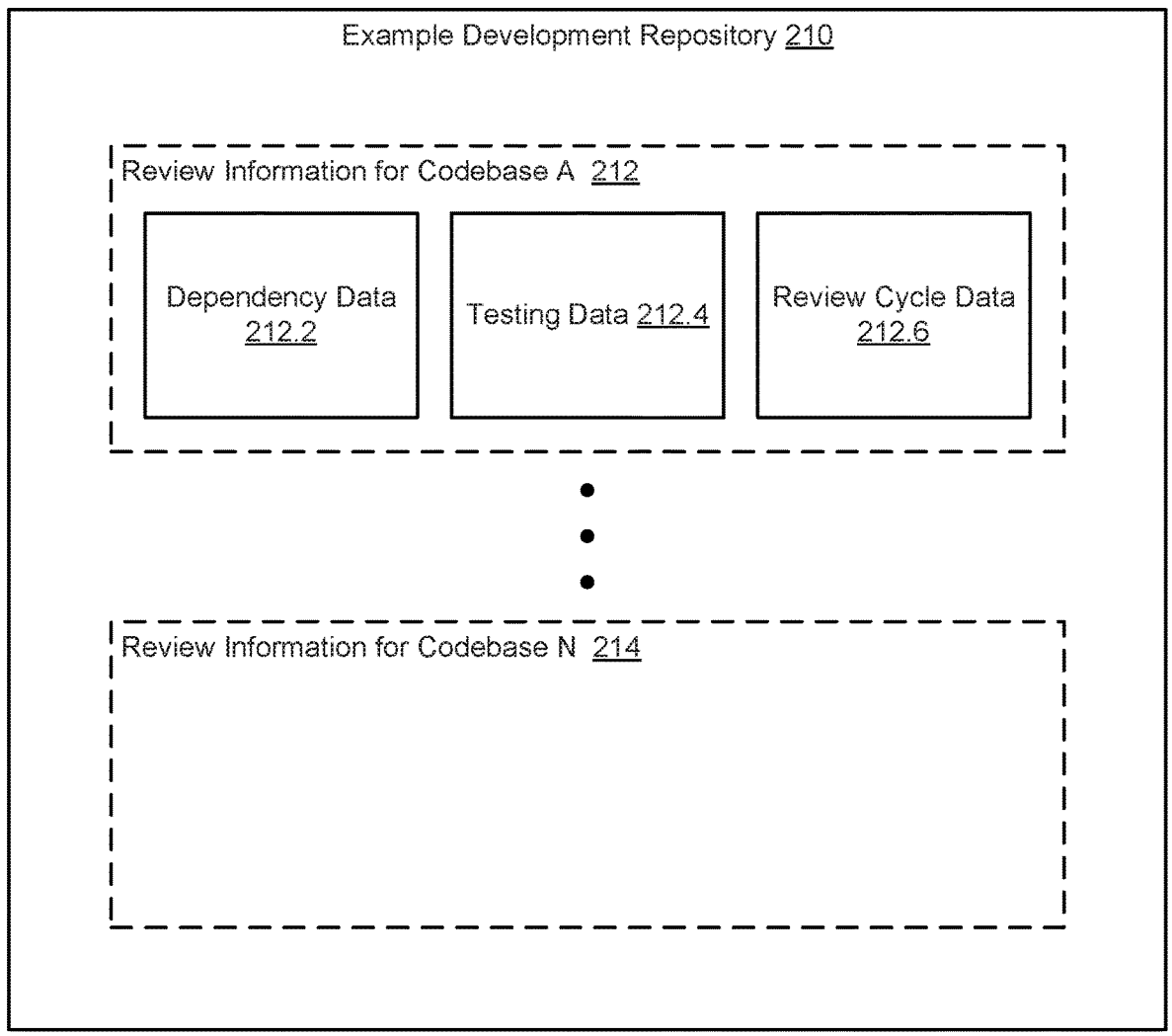
FIG. 2.2

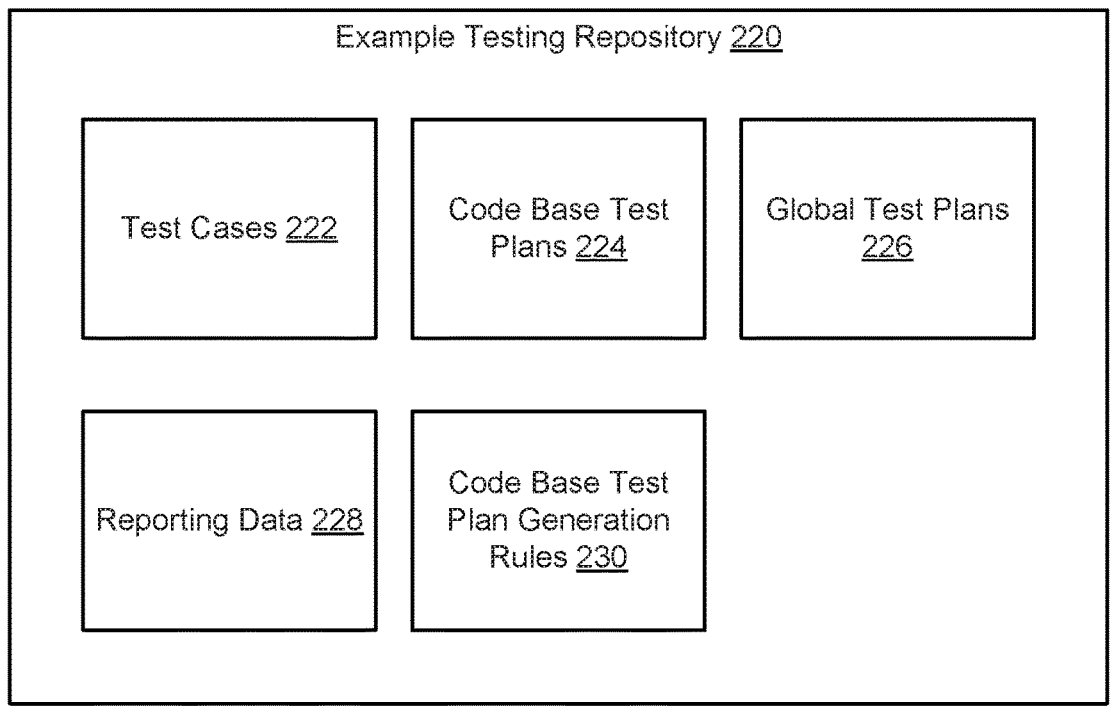
FIG. 2.3
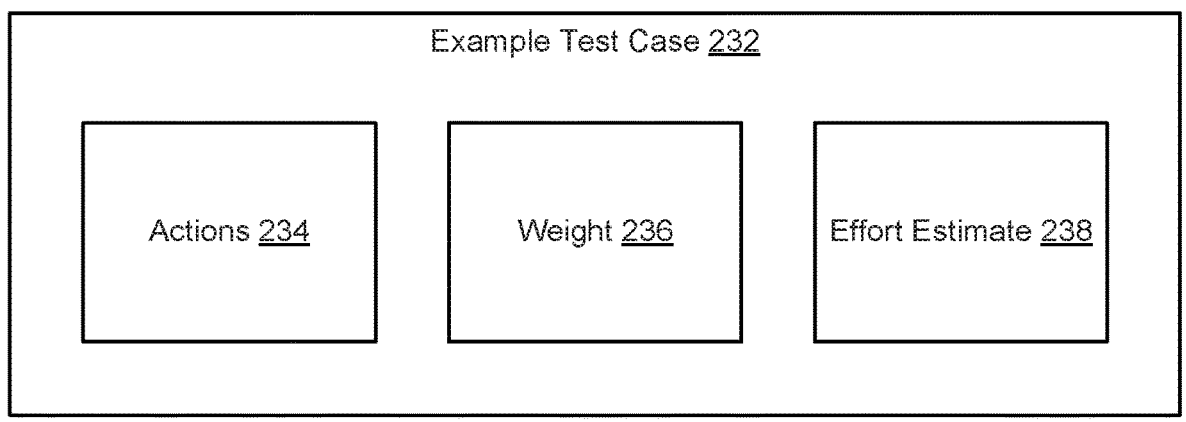
FIG. 2.4

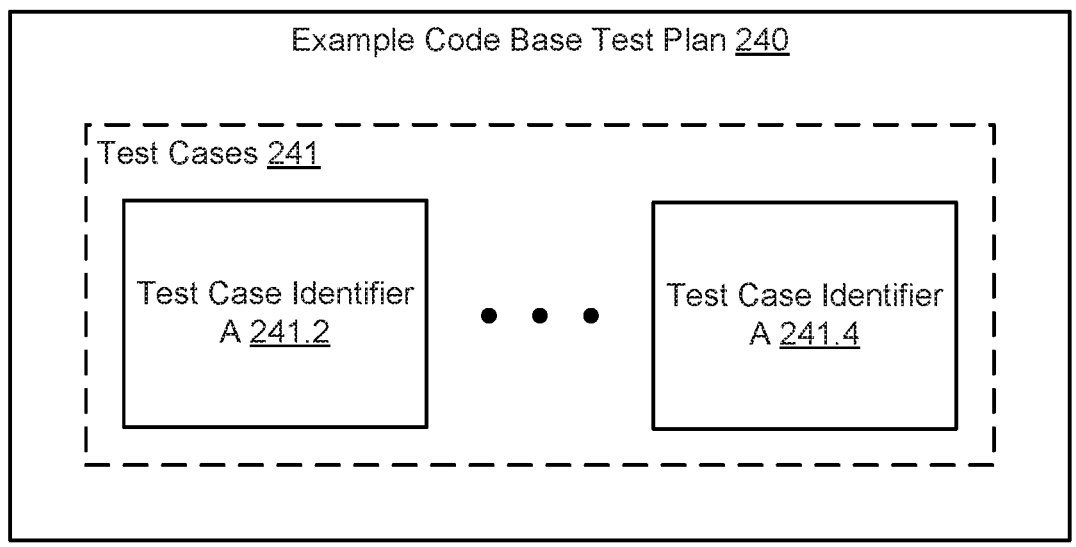
FIG. 2.5

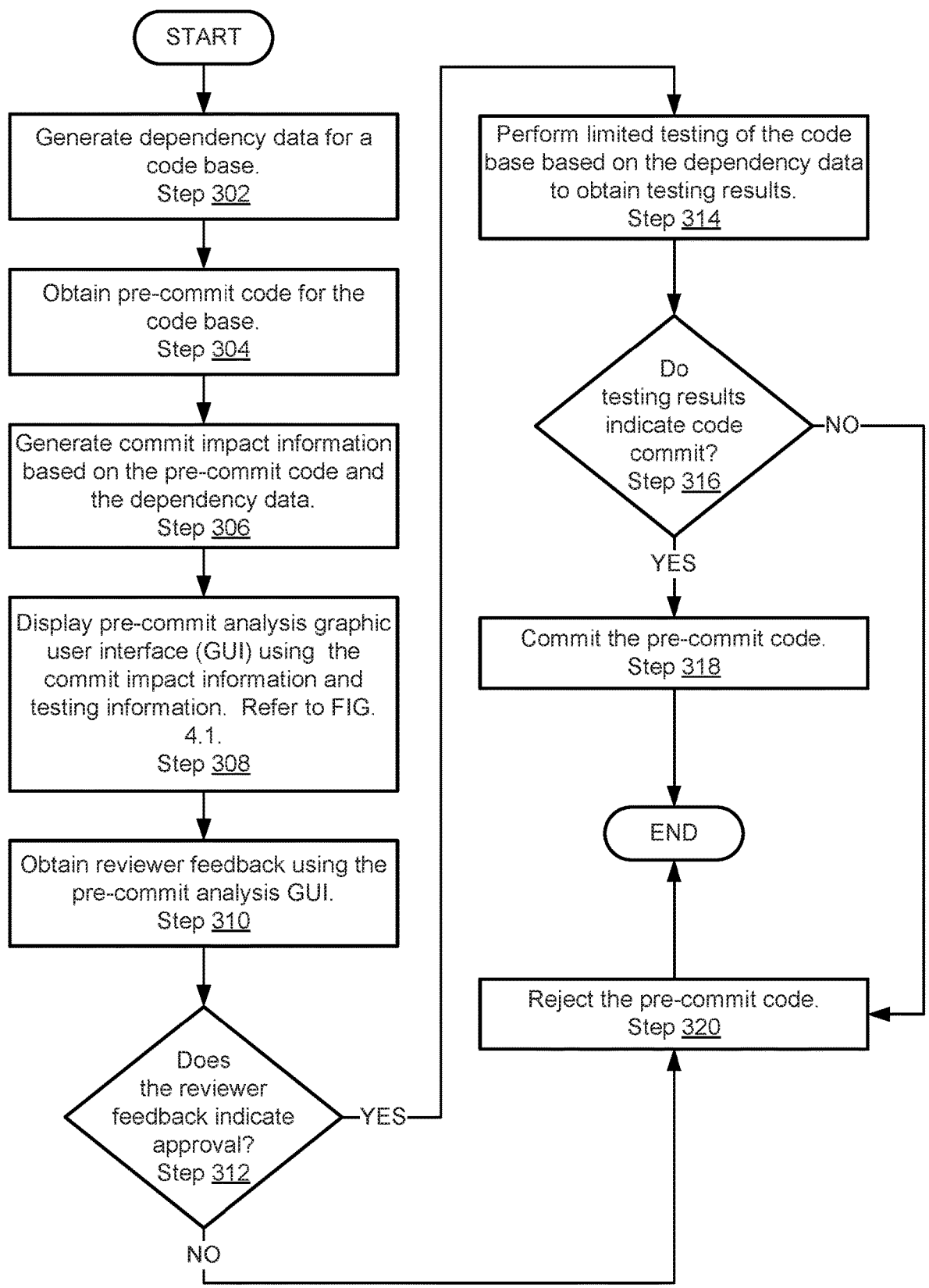
FIG. 3.1

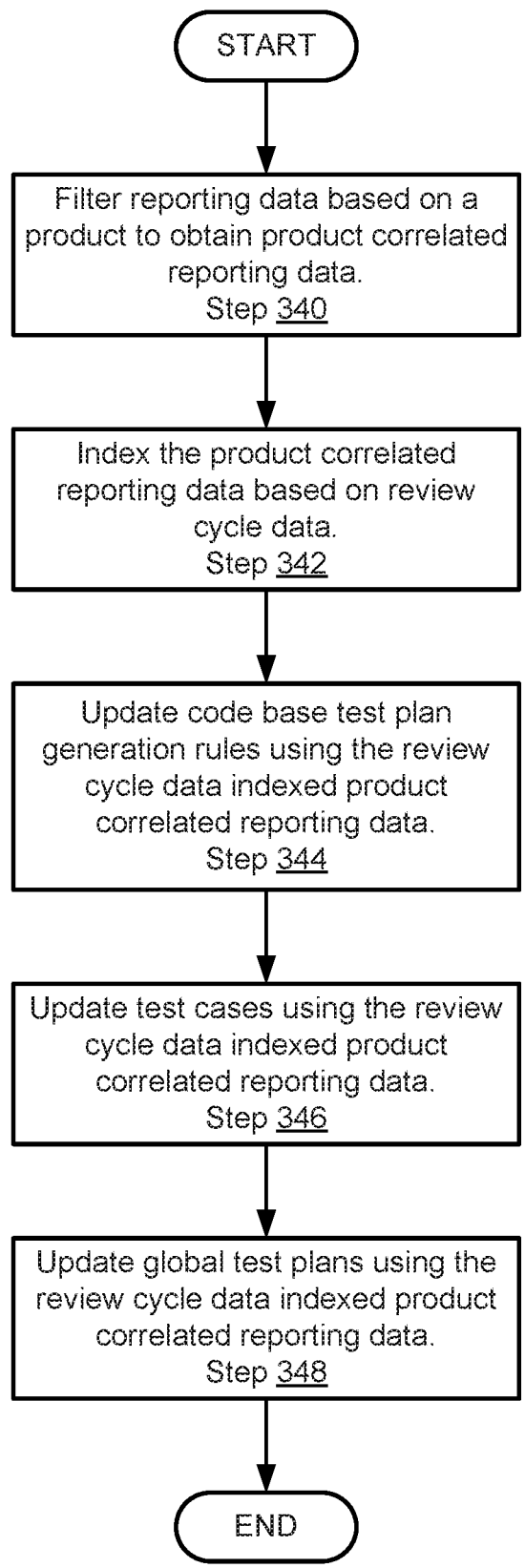
FIG. 3.2

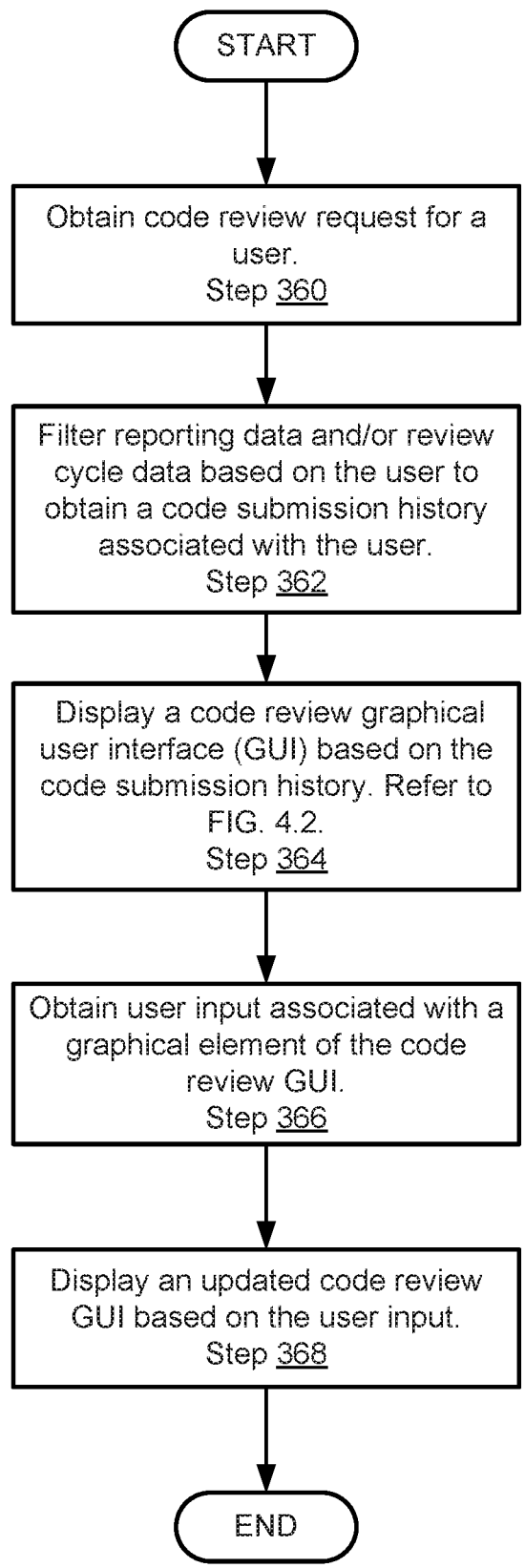
FIG. 3.3

Example Pre-Commit Analysis Graphical User Interface 400

Commit Impact Information Graphical Element 410

Identifiers Area 412
- First Identifier 414
- Second Identifier 416
- Fill Field 418

Values Area 420
- First Values 422
- Second Values 424
- Fill Field 426

Test Information Graphical Element 430

Identifiers Area 432
- First Identifier 434
- Second Identifier 436
- Fill Field 438

Values Area 440
- Values 442
- Second Values 444
- Fill Field 446

FIG. 4.1

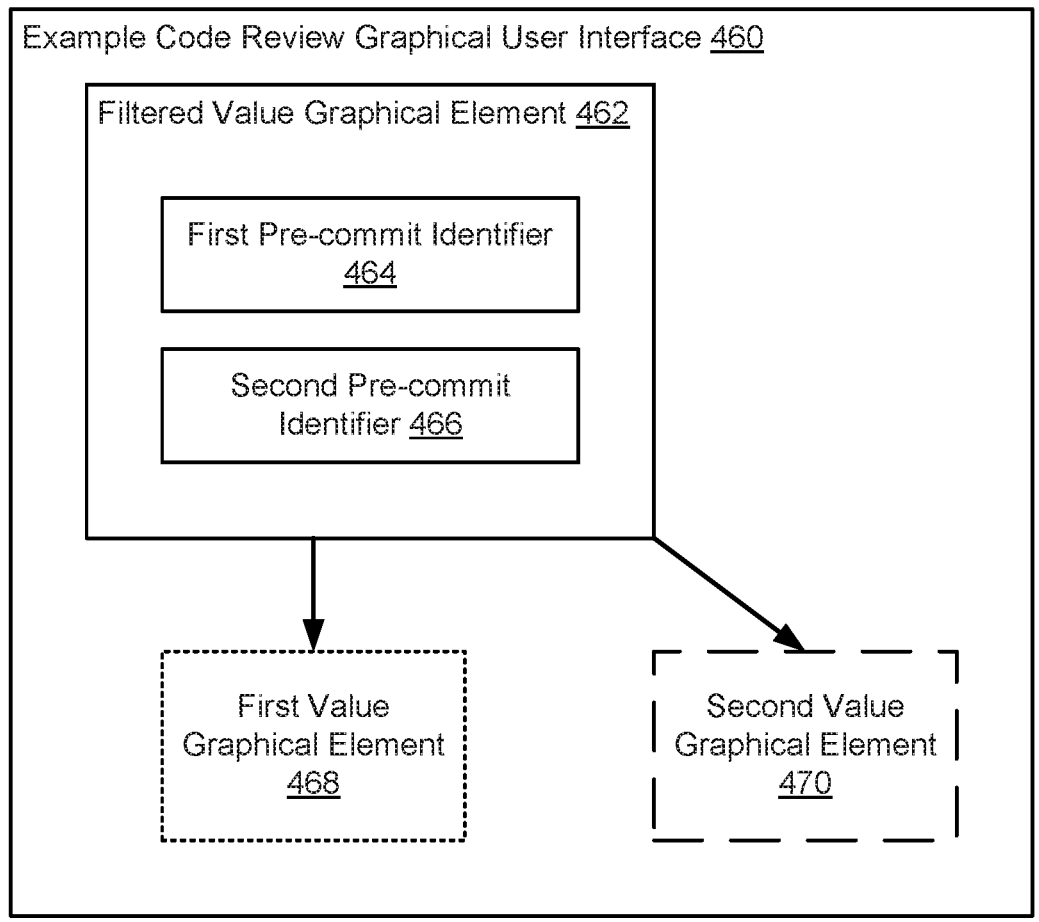
FIG. 4.2

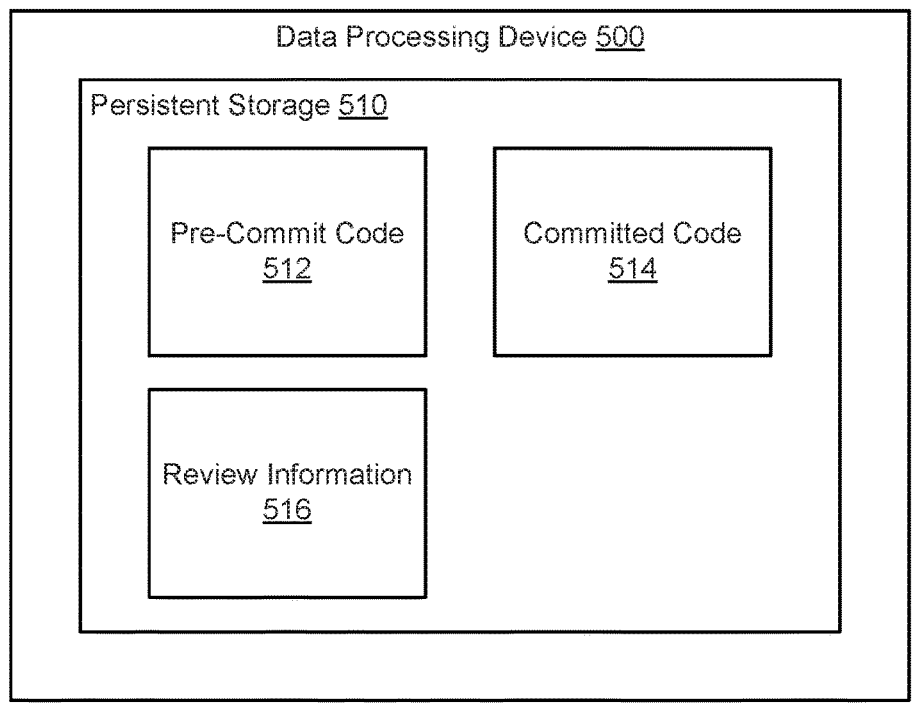
FIG. 5.1
| Files | Functions | Binaries/Libraries | Test Cases | Estimation |
|---|---|---|---|---|
| a.c | Fn1{}, Fn2{} | a.exe, a1.exe | t1, t2 | 13 |
| a.b | Fn3{} | a.exe | T5 | 4 |
| b.c | Fn4{} | c.exe | t13 | 3 |
FIG. 5.2

Pre-Commit Analysis Graphical User Interface 550

Commit Impact Information Graphical Element 552

| Files | a.c, a.b, b.c |
| Functions | Fn1{}, Fn2{}, Fn3{}, FN4{} |
| Binaries/Libraries | a.exe, a1.exe, c.exe |

Test Information Graphical Element 554

| a.c | Test 1, Test 2; 13 hours |
| a.b | Test 5; 4 hours |
| b.c | Test 13; 3 hours |

FIG. 5.3

Second Pre-Commit Analysis Graphical User Interface 560

Commit Impact Information Graphical Element 512

| Files | a.c, a.b, b.c |
|---|---|
| Functions | Fn1{}, Fn2{}, Fn3{}, FN4{} |
| Binaries/Libraries | a.exe, a1.exe, c.exe |

Updated Test Information Graphical Element 564

| a.c | Test 1, Test 2; 13 hours |
|---|---|
| a.b | Test 4; 6 hours |
| b.c | Test 13; 3 hours |

FIG. 5.4

| Files | Functions | Binaries/Libraries | Test Cases | Estimation |
|---|---|---|---|---|
| a.c | Fn1{}, Fn2{} | a.exe, a1.exe | t1, t2 | 13 |
| a.b | Fn3{} | a.exe | t4 | 6 |
| b.c | Fn4{} | c.exe | t13 | 3 |

FIG. 5.5

SYSTEM AND METHOD FOR MANAGING A CODE REPOSITORY

BACKGROUND

Software development may be performed by the cooperative effort of many individuals. To cooperatively develop software, each individual may produce code, i.e., computer instructions. The code produced by each of the individuals may be combined into a code base. The code base may be used to generate a product, i.e., compile code to generate an executable and/or other data structures.

When an individual generates code, the code may impact code generated by other individuals. For example, the code of one individual may impact how the code of another individual operates. Such a relationship may be referred to as a dependency.

Additionally, as the code for a product is developed, it may be revised. For example, an individual may produce additional code used to replace, change, and/or add to existing code of a code base. Such additions may impact the functionality of the resulting product.

SUMMARY

In one aspect, a data processing device in accordance with one or more embodiments of the invention includes persistent storage and a software development manager. The persistent storage stores a code repository. The software development manager generates commit impact information based on: pre-commit code for a code base stored in the code repository, and dependency data based on committed code of the code base; displays a pre-commit analysis graphic user interface (GUI) reflecting the commit impact information and testing information for the pre-commit code; obtains, using the displayed pre-commit analysis GUI, reviewer feedback regarding approval of the pre-commit code; makes a determination, based on the reviewer feedback, that the pre-commit code has been approved; in response to the determination: performs limited testing of the code base based upon the dependency data to obtain testing results; and commits the pre-commit code to the committed code when the testing results match a predetermined behavior.

In one aspect, a method for managing a code repository in accordance with one or more embodiments of the invention includes generating commit impact information based on: pre-commit code for a code base stored in the code repository, and dependency data based on committed code of the code base; displaying a pre-commit analysis graphic user interface (GUI) reflecting the commit impact information and testing information for the pre-commit code; obtaining, using the displayed pre-commit analysis GUI, reviewer feedback regarding approval of the pre-commit code; making a determination, based on the reviewer feedback, that the pre-commit code has been approved; in response to the determination: performing limited testing of the code base based upon the dependency data to obtain testing results; and committing the pre-commit code to the committed code when the testing results match a predetermined behavior.

In one aspect, a non-transitory computer readable medium in accordance with one or more embodiments of the invention includes computer readable program code, which when executed by a computer processor enables the computer processor to perform a method for managing a code repository. The method includes generating commit impact information based on: pre-commit code for a code base stored in the code repository, and dependency data based on committed code of the code base; displaying a pre-commit analysis graphic user interface (GUI) reflecting the commit impact information and testing information for the pre-commit code; obtaining, using the displayed pre-commit analysis GUI, reviewer feedback regarding approval of the pre-commit code; making a determination, based on the reviewer feedback, that the pre-commit code has been approved; in response to the determination: performing limited testing of the code base based upon the dependency data to obtain testing results; and committing the pre-commit code to the committed code when the testing results match a predetermined behavior.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 2.1 shows a diagram of an example code repository in accordance with one or more embodiments of the invention.

FIG. 2.2 shows a diagram of an example development repository in accordance with one or more embodiments of the invention.

FIG. 2.3 shows a diagram of an example testing repository in accordance with one or more embodiments of the invention.

FIG. 2.4 shows a diagram of an example test case in accordance with one or more embodiments of the invention.

FIG. 2.5 shows a diagram of an example code base test plan in accordance with one or more embodiments of the invention.

FIG. 3.1 shows a flowchart of a method of managing code commitment in accordance with one or more embodiments of the invention.

FIG. 3.2 shows a flowchart of a method of performing updates based on previous code commitments in accordance with one or more embodiments of the invention.

FIG. 3.3 shows a flowchart of a method of facilitating code review in accordance with one or more embodiments of the invention.

FIG. 4.1 shows a diagram of an example pre-commit code analysis graphical user interface in accordance with one or more embodiments of the invention.

FIG. 4.2 shows a diagram of an example code review graphical user interface in accordance with one or more embodiments of the invention.

FIGS. 5.1-5.5 show a non-limiting example of a system in accordance with embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing managing software development. A system in accordance with embodiments may provide an automated process for reviewing and testing pre-commit code being consider for commitment. The automated process for reviewing the pre-commit code may include determining the portions of the committed code that would be impacted by a commitment of the pre-commit code.

The automated process for testing the pre-commit code may be to generate a test plan that includes only limited testing of the portions of the committed code determined to be impacted by a commitment of the pre-commit code. By doing so, the computational and/or time cost may be reduced when compared to methods for testing that include global testing of the committed code for impacts of a possible code commitment.

Additionally, the system in accordance with embodiments of the invention may use feedback from reviewers to automatically refine the process for generating test plans. For example, when a reviewer modifies a test plan for testing of pre-commit code, the modifications by the reviewer may be used to update rules, utilized by the system, to generate the test plans. Thus, embodiments of the invention may provide a system that updates a plan generation process as new testing issues are discovered.

Figure 1:
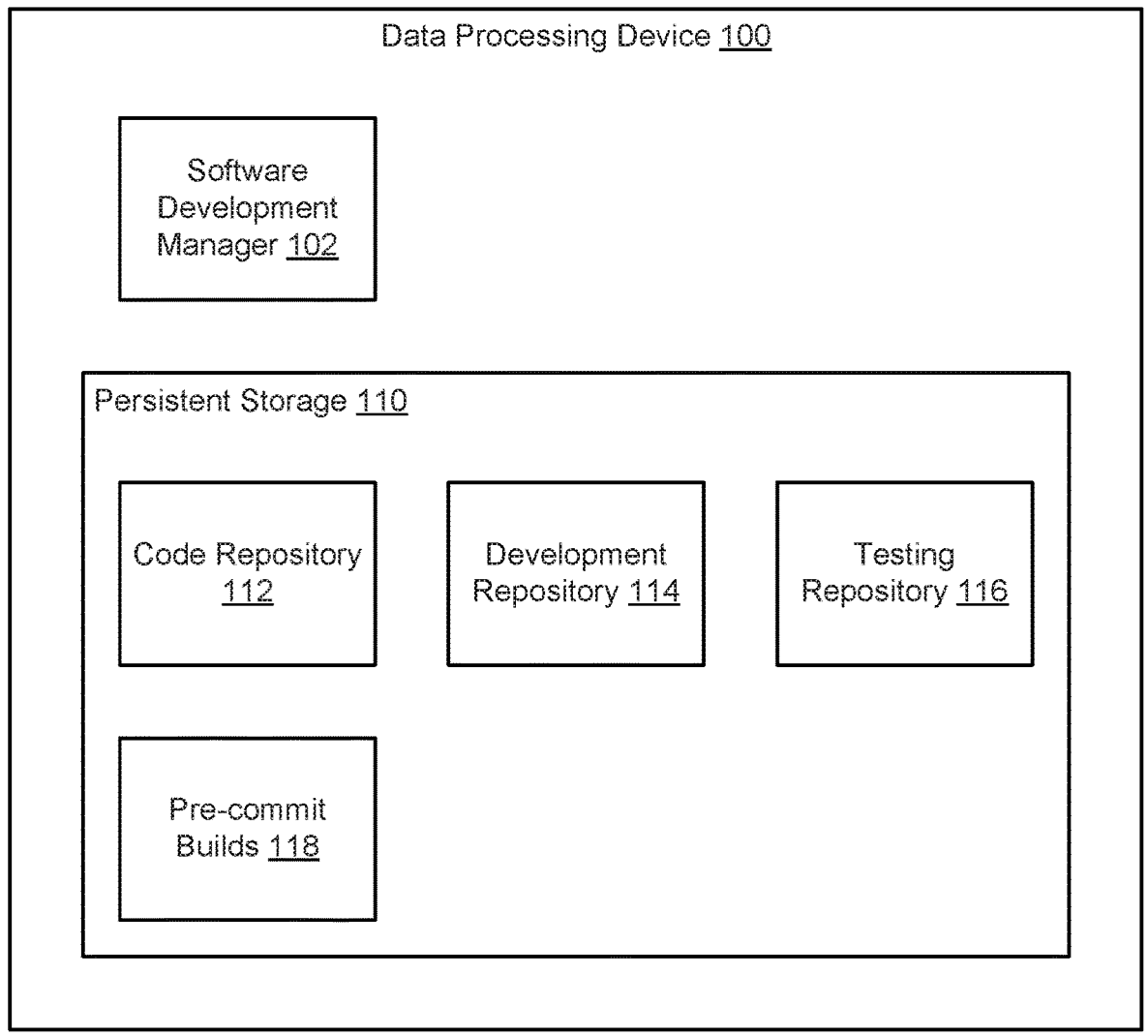
FIG. 1 shows a diagram of a data processing device in accordance with one or more embodiments of the invention.

FIG. 1 shows a diagram of the data processing device (100) in accordance with one or more embodiments of the invention. The data processing device (100) may include computing resources (e.g., processing resources, memory resources, storage resources, communication resources, and/or other types). The data processing device (100) may be implemented as a physical or a logical device.

If implemented as a physical device, the computing resources may include processors, memory, persistent storage (e.g., 110), etc. that provide the data processing device (100) with computing resources. If implemented as a logical device, the computing resources of the data processing device (100) may be the utilization, in whole or in part, of the physical computing resources of any number of computing devices by the data processing device (100). For additional information regarding computing devices, refer to FIG. 6.

For example, the data processing device (100) may be implemented as a virtual device that utilizes the virtualized resources, in whole or in part, of any number of computing devices. In another example, the data processing device (100) may be a distributed device. A distributed device may be a logical device that exists through the cooperative operation of any number of computing devices. The cooperative actions of the computing devices may give rise to the functionality of the data processing device (100). The data processing device (100) may be implemented as other types of physical or logical devices without departing from the invention.

In one or more embodiments of the invention, the data processing device (100) hosts a software development manager (102). The software development manager (102) may be a logical entity that utilizes the computing resources of the data processing device (100) for its execution. In other words, the software development manager (102) may be implemented as computer instructions stored in persistent storage (e.g., 110) that when executed by a processor of the data processing device (100) and/or other entities give rise to the functionality of the software development manager (102).

In one or more embodiments of the invention, all, or a part, of the functionality of the software development manager (102) is implemented using a specialized hardware device. The specialized hardware device may be, for example, a digital signal processor, a field programmable gate array, or an application specific integrated circuit. The functionality of the software development manager (102) may be provided using other types of specialized hardware devices without departing from the invention.

The software development manager (102) may provide software development management services. Software development management services may include managing code, i.e., computer instructions, stored in a code repository (112). For example, as software development projects for products are ongoing, code may be produced, i.e., pre-commit code, and added to code bases, i.e., committed code, to the respective products. When code is added to or removed from a code base, the functionality of a corresponding product may be impacted. For example, new functionality may be added to the product, functionality may be removed from the product, or functionality of the product may be modified.

In some cases, the impact of adding or removing code from a code base is not desirable. For example, an addition and/or removal of code from a code base may render the product inoperable and/or modify the functionality of the product in an undesirable way. Consequently, managing the addition and/or removal of code from a code base may be desirable.

The software development management services may also include managing the testing of code bases. As noted above, when pre-commit code is added to a code base the functionality of the product may be impacted. To determine whether the addition of the pre-commit code to the code base meets the goals associated with the addition, testing of the code base impacted by addition of the pre-commit code base may be performed. However, such testing is only helpful if the testing is able to ascertain the changes to the functionality of the code base. Further, testing may be a computationally expensive and time consuming process. Thus, it may be valuable to limit testing while performing sufficient testing to ascertain the changes to the functionality of a code base caused by the addition of pre-commit code.

In one or more embodiments of the invention, testing of code bases is managed by using the outcomes of previous testing to update how future testing is performed. For example, plans for future testing of code bases may be automatically modified based on the outcomes of previous testing. Similarly, the outcomes of testing code bases may be used to synthesize new test procedures. Additionally, the outcomes of testing different code bases may be used to update testing rules that are enforced for testing of all code bases. By doing so, testing of code bases may be continuously updated to automatically reduce the likelihood of insufficiently testing code bases (and corresponding products after compiling) resulting in the inadvertent inclusion of undesirable functionality in products.

The software development management services may also include reviewing services. Reviewing services may provide analysis of multiple, previous submission of pre-commit code for commitment to code bases. The analysis may indicate repetitive or common issues with the submitted pre-commit code. Graphical representations of the analysis may be generated to provide visualizations of the analysis that may be used to improve future submission of pre-commit code. By doing so, the likelihood of future submission of pre-commit code resulting in undesirable product behavior may be reduced.

To provide the above noted functionality of the software development manager (102), the software development manager (102) may perform all, or a portion, of the methods illustrated in FIGS. 3.1-3.3. Additionally, when providing software development management services, the software development manager may utilize data structures stored in persistent storage (110) of the data processing device.

The persistent storage (110) may be a physical or logical device that provides storage resources to the data processing device (100). If implemented as a physical device, the persistent storage (110) may include hard disk drives, solid state drives, tape drives, or any other type of physical device for providing storage resources for storing data. If implemented as a logical device, the persistent storage (110) may utilize the physical storage resource of any number of computing devices to provide storage resources for storing data. For example, the persistent storage (110) may be a virtual device.

The persistent storage (110) may store data structures utilized by the software development manager (102) and/or other entities. The data structures may include a code repository (112), a development repository (114), a testing repository (116), and pre-commit builds (118). Each of these data structures is discussed below.

The code repository (112) may be a data structure that includes code bases of products. The code repository (112) may include any number of code bases. For additional details regarding the code repository (112), refer to FIG. 2.1.

The development repository (114) may be a data structure that includes information used to (i) analyze the impact that addition of pre-commit code may have on committed code, (ii) plans for testing that impact that the addition of pre-commit code to committed code will have on a corresponding product, and (iii) information regarding the review processes that was performed during each commitment of pre-commit code to a code base. For additional details regarding the development repository (114), refer to FIG. 2.2.

The testing repository (116) may be a data structure that includes information used to set plans for testing pre-commit code to code bases. The plans for testing may be individualized for each code base. For additional details regarding the testing repository (116), refer to FIGS. 2.3-2.5.

The pre-commit builds (118) may be images of products that have been modified based on the pre-commit code during testing of the pre-commit code. The images of the products may only include a portion of the functionality of the product because only those portions of the committed code associated with products impacted by the pre-commit code may be compiled to obtain the pre-commit builds (118). The pre-commit builds (118) may be exercised to determine the behavior of the pre-commit builds (118). The behavior of the pre-commit builds may be compared to pre-determined behavior of associated test cases to determine whether the pre-commit code should be committed.

While the data processing device (100) of FIG. 1 has been described and illustrated as including a limited number of components for the sake of brevity, a data processing device (100) in accordance with embodiments of the invention may include additional, fewer, and/or different components than those illustrated in FIG. 1 without departing from the invention.

To further clarify aspects of embodiments of the invention, diagrams of data structures that may be used by the data processing device (100) of FIG. 1 are illustrated in FIGS. 2.1-2.5.

FIG. 2.1 shows a diagram of an example code repository (200) in accordance with one or more embodiments of the invention. As noted above, a code repository may include code that is associated with different products. Such code may be used to produce the corresponding products by compiling the code into an executable. An executable may be code that when executed by a processor gives rise to the functionality of a corresponding product.

The example code repository (200) may include code associated with any number of code bases (e.g., 202, 204). The code of each of the code bases (e.g., 202, 204) may be written in any language (e.g., python, C, java, etc.) or combination of languages. Each of the code bases (e.g., 202, 204) may include any amount of code.

The code of each of the code bases (e.g., 202, 204) is divided into pre-commit code (e.g., 202.2) and committed code (202.4). The committed code (202.4) may be code that has been used to generate the product. In other words, the live code that is used to produce a current, or past, version of the product corresponding to the code base (e.g., 202).

The pre-commit code (202.2) may be code that has not yet been accepted for use in generation of the product. For example, pre-commit code may be code that a developer, e.g., a software developer, has submitted to modify the committed code (e.g., 202.4). By modifying the committed code, the functionality of a product resulting from the committed code may be different from that prior to committing of the pre-commit code. As noted above, a system in accordance with embodiments of the invention may manage commitment of code to manage the process of developing software.

FIG. 2.2 shows a diagram of an example development repository (210) in accordance with one or more embodiments of the invention. As noted above, development repositories may be data structures that may be used, in part, during the process of determining whether pre-commit code should be added to committed code. For example, the example development repository (210) may include information used to enable a reviewer of pre-commit code to better determine whether to move forward with testing of the pre-commit code.

The example development repository (210) may include review information (e.g., 212, 214) for any number of code bases associated with corresponding products. The review information for each of the code bases may include dependency information (e.g., 212.2), testing data (e.g., 212.4), and review cycle data (212.6). The review information may include additional, only part of the aforementioned information, and/or different information used to facilitate code management without departing from the invention.

The dependency data (212.2) may be a data structure that includes information regarding committed code of a code base and/or the product associated with the code base. The dependency data (212.2) may include one or more of: (i) a list of the modules of the product and/or relationships between the modules and different portions of the committed code, (ii) a list of the interdependencies between the modules of the product, (iii) a list of all of the portions, e.g., files, of the committed code, (iv) a list of the names of each of the functions of the committed code and/or each of the functions impacted by the committed code, (v) a list of application programming interfaces of the committed code and/or the associations between the application programming interfaces and the portions of the committed code, (vi) a list of the executables of the product, and/or (vii) a list of the libraries of the product and/or a listing of the pre-compiled routines of each of the libraries (e.g., modules stored in object format). Additionally, the dependency data (212.2) may be updated when code is committed.

The dependency data (212.2) may be obtained by analyzing the committed code of a code base and/or the product, e.g., the executables and/or libraries of the product. In one or more embodiments, each of the portions of the committed code includes information used to facilitate the analysis. Each of the portions of the committed code may include variable declarations that correspond to portions of a product. Such variable declarations may be referenced by makefiles, or other instructions for generating portions of the production. The resulting product may be analyzed to identify the associations between the portions of the committed code and the corresponding portions of the product. For example, when the committed code is compiled to obtain executables and/or libraries for the product, the executables and/or libraries may include strings that may be identified via string searching and associated with the corresponding declarations of the variables in the portions of the committed code which may also be identified using string searching. Thus, the portions of the product associated with the portions of committed code may be identified by string searching for the defined variable included in the portions of the committed code. The dependency data (212.2) may be obtained using other types of analysis without departing from the invention.

The testing data (212.4) may be a data structure that includes information regarding (i) the process of testing the committed code after updating based on pre-commit code, (ii) predictions regarding the duration for testing, and/or (iii) the results of the testing. For example, the testing data (212.4) may include, in part, a list of test cases to be used during testing. The testing data (212.4) may include additional, less, and/or different information used to facilitate testing without departing from the invention.

The process of testing may be based on information included in a testing repository. The process of testing may include testing the behavior of the product resulting from compiling of the committed code after updating based on the pre-commit code. For example, the testing data (212.4) may specify one or more test cases that are to be performed using the compiled product. Each of the test cases may have a corresponding desired behavior, i.e., predetermined behavior, for the compiled product. If the compiled product does not follow the desired behavior during performance of the test case, the testing may indicate that the pre-commit code is unsatisfactory. In other words, the pre-commit code may not be suitable for commitment.

For example, to perform a test case, the pre-commit code may be committed by deploying the changes to an image of the product. To deploy the changes to the image, only those portions of the committed code impacted by the pre-commit code may be compiled. The image, a binary, may be updated to reflect the newly compiled code. The image of the product may then be exercised, e.g., subjected to actions specified by the test case.

The process of testing the compiled product may be entirely automated. In other words, the processing of performing the test cases and aggregating the results of performing the test case may not be performed by a user. Rather, the process of testing may be entirely performed without user intervention.

The processes of testing may be tailored to each code base. In other words, the selection of the test cases included in testing of the code base may be based on the code base. For additional details regarding tailoring of the processes of testing, refer to FIG. 2.3.

The review cycle data (212.6) may be a data structure that includes information regarding the processes of determining whether to commit pre-commit code. The review cycle data (212.5) may include such information regarding any number of attempts, e.g., pre-commit code review, to commit pre-commit code.

In one or more embodiments of the invention, the review cycle data (212.6) includes (i) changes to commit impact information made by a reviewer, (ii) changes to test information made by a reviewer, (iii) testing results, and/or (iv) information regarding the persons that participated in the review, e.g., an identity of the developer that provided the pre-commit code under test, identities of reviewers, etc. Such information may be specified on a granular level, e.g., associated with each attempt to commit pre-commit code.

As will be discussed in greater detail below, the change impact information may include information that is presented to a reviewer during the review process. The change impact information may be automatically generated without user intervention. Once presented to a reviewer, the review may modify the change impact information.

Like the change impact information, the test information may be information that is presented to a reviewer during the review process. The test information may be automatically generated without user intervention. The test information may include the test cases that will be performed during testing, predictions of testing durations, and/or other information regarding a to-be-performed testing. The test information may also include weights, or other information used to indicate the importance of the test cases. Such information may be used to order performance of the test cases. Once presented to a reviewer, the reviewer may modify the testing information. By doing so, the reviewer may update future testing.

As will be discussed in greater detail below, changes to the change impact information and/or the testing information may be used to update the dependency data (212.2), the testing data (212.4), and/or information included in a testing repository.

The testing results may be information regarding the process of testing and/or the outcomes of the testing. For example, the testing results may specify the test cases that were performed during the testing and whether performance of each of the test cases resulting in a satisfactory or unsatisfactory outcome.

As discussed above, the testing data (212.4) may be based, in part, on information included in a testing repository. FIG. 2.3 shows a diagram of an example testing repository (220) in accordance with one or more embodiments of the invention. The example testing repository (220) include information that enables testing to be performed and/or results of testing. The example testing repository (220) may include test cases (222), Code base test plans (224), global test plans (226), reporting data (228), and Code base test plan generation rules (230). Each of these data structures is discussed below.

In one or more embodiments of the invention, the test cases (222) are data structures that include instructions for performance of tests. Each of the test cases (222) may include different instructions for performing a test to determine whether the addition of pre-commit data results in satisfactory operation of a product. The instructions included in each of the test cases (222) may cause automated actions to be performed. Doing so may result in testing of one or more portions of a product. The results of the testing, e.g., the behavior of the compiled code during execution, may be compared to predetermined behavior specified by the test cases (222) that is the desired behavior of the compiled code.

For example, a test case may include instructions that cause one or more portions of code of a code base to be compiled. The compiled code may be run based on additional instructions included in the test case. Information regarding running of the compiled code may be recorded. The recorded information may be compared to information included in the test case to determine whether the compiled code is acceptable. For additional information regarding test cases (222), refer to FIG. 2.4.

In one or more embodiments of the invention, the code base test plans (224) are data structures that include plans for performing testing. The testing plans may specify the test cases (222) to be used for different code bases. For example, a code base test plan may specify that when a code base associated with a product is going to be tested, one or more of the test cases (222) should be used during the testing. In one or more embodiments of the invention, the test plans of the code base test plans (224) are generated based on code base test plan generation rules (230). For additional information regarding code base test plans (224), refer to FIG. 2.5.

In one or more embodiments of the invention, the global test plans (226) are test plans that apply to all code bases. The global test plans (226) may be used in conjunction with the code base test plans (224) to generate the testing data (e.g., 212.4) included in development repositories. In other words, the test plans in the example testing repository (220) may be used as templates to generate the processes for testing code of code bases.

In one or more embodiments of the invention, the reporting data (228) may be a data structure that includes information regarding the results of testing performed based on the test plans included in the example testing repository (220). For example, when testing of a code base is performed, the results of that testing may be stored as part of the reporting data (228) and/or in other locations. As will be discussed in greater detail below, reporting data (228) may be used to improve the process for developing products.

In one or more embodiments of the invention, the code base test plan generation rules (230) is a data structure that includes one or more rules for generating code base test plans (224). The rules included in the code base test plan generation rules (230) may be updated based on feedback from reviewers past with managing the commitment of pre-commit code to committed code of code bases and analysis of the outcome of previous code submission, e.g., analysis of the reporting data (228). The rules included in the code base test plan generation rules (230) may also be updated based on feedback obtained from reports of bugs in committed code.

To further clarify aspects of the example testing repository (220), a diagram of an example test case (232) in accordance with one or more embodiments of the invention is shown in FIG. 2.4. As discussed above, a test case may be used to test the potential addition of pre-commit code. The example test case (232) may include actions (234), a weight (236), in an effort estimate (238).

The actions (234) may specify one or more steps performed during testing. For example, the actions (234) may include compiling of a portion of a code base, running the compiled portion, exercising the compiled portion, and recording results of exercising the compiled portion. Exercising the compiled portion may include, for example, providing predetermined data to the compiled portion, invoking functionality of the compiled portion, or otherwise causing the compiled portion to use its functionality in a manner that would be expected during real-world operation.

The weight (236) may specify a relative importance of the example test case (232) with respect to other test cases. As discussed above, performing a test case may be a time-consuming and/or computationally expensive process. Consequently, it may be important to prioritize performing some test cases before others due to time or computational resource limitations. The weight (236) may be used to indicate whether the example test case (232) should be prioritized over other test cases. The weight (236) may be, for example, a ranking of the example test case (232) with respect to the other test cases (222, FIG. 2.3).

The effort estimate (238) may be an indication of how long performance of the example test case (232) may take to complete. The effort estimate (238) may be generated via any method without departing from the invention. For example, the effort estimate (238) may be the duration of time it took to perform the example test case (232) the last time it was performed.

To further clarify aspects of the example testing repository (220) a diagram of an example code base test plan (240) is shown in FIG. 2.5. As discussed above, a code base test plan may specify a plan for performing testing of a code base. The example code base test plan (240) may be associated with a code base for which it defines testing for code commitment purposes. The example code base test plan (240) may indicate that test cases (241) are to be performed when testing a code base for code commitment purposes.

In one or more embodiments of the invention, the example code base test plan (240) includes any number of test case identifiers (e.g., 241.2, 241.4). The inclusion of a test case identifier in the example code base test plan (240) may indicate that the test case identified by the test case identifier is to be performed for code commitments. While not illustrated, the example code base test plan (240) may also specify desired behavior of the product associated with the code base for which the example code base test plan (240) specifies code commitment testing. The example code base test plan (240) may include additional and/or different information used to define testing for code commitment purposes without departing from the invention.

As described above, a software development manager (102) may provide software development management services. FIGS. 3.1-3.3 illustrate methods that may be performed when software development management services are provided by the software development manager (102) in accordance with one or more embodiments of the invention.

FIG. 3.1 shows a flowchart of a method in accordance with one or more embodiments of the invention. The method depicted in FIG. 3.1 may be used to manage code commitment in accordance with one or more embodiments of the invention. The method shown in FIG. 3.1 may be performed by, for example, a software development manager (e.g., 102, FIG. 1). Other components of the system illustrated in FIG. 1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, dependency data for code base is generated.

In one or more embodiments of the invention, the dependency data for the code base is generated based on committed code of the code base and/or product, e.g., executables and/or libraries, associated with the code base. The dependency data may be, for example, a dependency tree that illustrates relationships between the committed code and the product. The dependency data may include additional and/or different information that describes the committed code of the code base and/or the product without departing from the invention. For additional details regarding dependency data, refer to FIG. 2.2.

In step 304, pre-commit code for the code base is obtained.

In one or more embodiments of the invention, the pre-commit code is obtained from a developer. For example, the pre-commit code may be submitted for review. The pre-commit code may be submitted by storing a copy of the pre-commit code in a predetermined location and/or notifying the software development manager of the pre-commit code.

Once pre-commit code is obtained, it may be indexed as a code submission. For example, a universally unique identifier may be assigned to the code submission. By doing so, a record of the pre-commit code may be generated for future use. The record may include, for example, information regarding the developer that produced the pre-commit code and/or other relevant information regarding the pre-commit code. Such information may be stored in review cycle data (e.g. 212.6, FIG. 2.2).

In step 306, commit impact information may be generated based on the pre-commit code and the dependency data.

In one or more embodiments of the invention, the commit impact information is generated automatically without human intervention. For example, predetermined analysis may be performed on the pre-commit code and the dependency data to generate the commit impact information.

In one or more embodiments of the invention, the commit impact information includes information regarding the impact that committing of the pre-commit code will have on the committed code. The commit impact information may include one or more of the following: (i) a listing of modifications of the committed code that would be caused by updating the committed code using the pre-commit code, (ii) a listing of modifications of functions that would be caused by updating the committed code using the pre-commit code, (iii) a listing of modifications of modules that would be caused by updating the committed code using the pre-commit code, (iv) a list of modifications of components that would be caused by updating the committed code using the pre-commit code; a listing of modifications of interdependent components that would be caused by updating the committed code using the pre-commit code, (vi) a listing of modifications of libraries that would be caused by updating the committed code using the pre-commit code, and (vii) a list of modifications of binaries that would be caused by updating the committed code using the pre-commit code. The listings may be lists or other types of data structures. The commit impact information may include additional and/or different types of information regarding how committing the pre-commit code would modify the committed code and/or the product without departing from the invention.

In step 308, a pre-commit analysis graphic user interface is displayed using the commit impact information and testing information. For additional information regarding the pre-commit analysis graphic user interface, refer to FIGS. 3.3 and 4.1.

The pre-commit analysis graphic user interface may enable reviewer to reference the commit impact information and/or testing information. Additionally, the pre-commit analysis graphic user interface may be used to obtain feedback from the reviewer. The reviewer feedback may indicate whether testing should be performed. Additionally, the pre-commit analysis topic user interface may enable the reviewer to modify the commit impact information and/or testing information. Such modifications may be used to modify the dependency data (212.2, FIG. 2.2) and/or the testing data (212.4) included in a development repository. By doing so, reviewer-driven feedback may be incorporated into the example development repository (210, FIG. 2.2) to better guide future reviews for code commitment review purposes.

In step 310, reviewer feedback is obtained using the pre-commit analysis graphic user interface.

In one or more embodiments of the invention, the pre-commit analysis graphic user interface includes one or more input fields for obtaining user input. The reviewer feedback may be obtained using the input fields.

In step 312, it is determined whether the reviewer feedback indicates approval of the pre-commit code for testing. For example, the pre-commit analysis graphic user interface may include an input field for the reviewer to provide user input that indicates whether the reviewer approves. If it is determined that the reviewer feedback indicates approval of the pre-commit code for testing, the method may proceed to step 314. If it is determined that the reviewer feedback does not indicate approval of the pre-commit code for testing, the method may proceed to step 320.

In step 314, limited testing of the code base is performed based on the dependency data to obtain testing results.

In one or more embodiments of the invention, the code base is subjected to limited testing by only performing testing on the portions of the committed code that would be impacted by updating the committed code using the pre-commit code. In other words, only those portions of the committed code that would be impacted by the pre-commit code are subjected to testing. By doing so, only a portion of the committed code is updated based on the pre-commit code and compiled for testing purposes. The results of the limited testing may be stored for later use as part of the review cycle data (212.6, FIG. 2.2) and/or reporting data (228, FIG. 2.3).

In one or more embodiments of the invention, the test cases used to test the code base are performed based on the weight associated with each of the test cases. Test cases that are associated with higher weights may be performed prior to test cases that are associated with lower weights. By doing so, test cases that have are more important than other test cases may be prioritized for performance when testing is performed.

In step 316, it is determined whether testing results for the limited testing indicate that the pre-commit code should be committed. The testing results may indicate that the pre-commit code should be committed when the behavior of the compiled portions of the committed code modified by the pre-commit code match predetermined behavior. If the testing results indicate that the pre-commit code should be committed, the method may proceed to step 318. If the testing results do not indicate that the pre-commit code should be committed, the method may proceed to step 320.

In step 318, the pre-commit code is committed. The pre-commit code may be committed by updating the committed code based on the pre-commit code. In other words, the pre-commit code is accepted for inclusion in the committed code.

When pre-commit code is committed, the review cycle data (212.6) may be updated to reflect that the pre-commit code was committed. As will be discussed below, such information may be used to improve future software development processes.

To commit the pre-commit code, the committed code may be modified based on the pre-commit code. In other words, the changes to the committed code specified by the pre-commit code may be made. The changes may include additions to the committed code, removals of portions of the committed code, and/or modifications of portions of the committed code.

The method may end following Step 318.

Returning to step 312, the method may proceed to Step 320 if the reviewer feedback does not indicate approval of the pre-commit code for testing.

In step 312, the pre-commit code is rejected. In other words, the committed code may not be updated based on the pre-commit code.

When pre-commit code is not committed, the review cycle data (212.6) may be updated to reflect that the pre-commit code was not committed. As will be discussed below, such information may be used to improve future software development processes.

By implementing the method shown in FIG. 3.1, a data processing device in accordance with embodiments of the invention may provide an improved method for managing the commitment of code to code bases when compared to contemporary methods. The improved method may provide reviewers with a wealth of information, automate the testing processes, and/or generate rich data for future code reviews that may be used to improve future software development processes.

Using information regarding the process of reviewing and committing code illustrated in FIG. 3.1, the process for conducting future code reviews may be improved. FIG. 3.2 shows a flowchart of a method in accordance with one or more embodiments of the invention. The method depicted in FIG. 3.2 may be used to improve the processes for testing pre-commit code in accordance with one or more embodiments of the invention. The method shown in FIG. 3.2 may be performed by, for example, a software development manager (e.g., 102, FIG. 1). Other components of the system illustrated in FIG. 1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 340, reporting data is filtered based on a product to obtain product correlated reporting data.

As discussed above, reporting data may include the outcome of previous attempts to commit code. Each of the attempts may be associated with a corresponding product. To filter reporting data, the product may be used as a key. By doing so, the information included in the reporting data associated with each of the previous attempts to commit code that are associated with the product may be identified. The reporting data may be filtered via other methods without departing from the invention.

In one or more embodiments of the invention, the product correlated reporting data includes information regarding one or more previous attempts to commit code. The information regarding the one or more previous attempts to commit code may include, for example, the outcome of the attempt to commit code, commit impact information associated with the attempt to commit code, and/or other information regarding the previous attempts to commit code.

In step 342, the product correlated reporting data is indexed based on review cycle data.

Indexing the product correlated reporting data based on the review cycle data may place the product correlated reporting data into a searchable format. The searchable format may enable portions of the product correlated reporting data associated with each attempt to commit code to be identified based on characteristics of each of the attempts to commit code.

For example, after indexing, the product correlated reporting data may be searched to identify all of the attempts to commit code in which a specific portion of committed code was impacted by the attempt commit code.

In another example, after indexing, the product correlated reporting data may be searched to identify a test case used during the testing portion of each attempt to commit code to obtain search results. The search results may then be further searched to identify attempts to commit code in which a reviewer added the test case to obtain second search results. The second search results may then be further searched to identify corresponding portions of the committed code that were impacted by the attempt to commit code. By doing so, reviewer modifications to test plans may be identified and associated with particular attempts to commit code. As will be discussed with respect to steps 344, such information may be used to update code base test plan generation rules (230, FIG. 2.3), test cases (222, FIG. 2.3), code base test plans (224, FIG. 2.3), and/or global test plans (226, FIG. 2.3).

For example, when an issues regarding committed code is identified, the issue may be identified as being caused by a previous code commit. Such an identification may be made using dependency information.

In another example, when multiple pre-commit code commit-attempts impact similar portions of the committed code (identifiable using dependency information), the code base test plans (224, FIG. 2.3) may be modified to ensure that future pre-commit code commit-attempts are ordered in a manner that expands the test case coverage for both code commit-attempts.

In step 344, code base test plan generation rules are updated using the review cycle data indexed product correlated reporting data of step 342.

In one or more embodiments of the invention, the code base test plan generation rules are updated by identifying modifications to test plans by reviewers. For example, when a reviewer is reviewing pre-commit code, test plan for the pre-commit code may be presented to the reviewer. The reviewer may modify the test plan. Such modifications by the reviewer may be obtained by searching the product correlated reporting data that is indexed based on the review cycle data. The modifications by the reviewer may be used to update the code base test plan generation rules so that when similar pre-commit code is submitted for review in the future, the future test plans will reflect the reviewer modifications. By doing so, the code base test plan generation rules may be periodically updated.

For example, if a reviewer of previous code commit attempts identifies that a test case has a higher likelihood of identifying one or more problems with the code commit-attempts, the code base test plan generation rules may be updated so that the test case will be performed before other test cases.

In another example, if the review cycle data indexed product correlated reporting data indicates that a particular test case identifies one or more problems with code commit-attempts more regularly than other test cases, the code base test plan generation rules may be updated to automatically cause the particular test case to be performed prior to other test cases even if those other test cases have higher weights.

In step 346, test cases are updated using the review cycle data indexed product correlated reporting data.

In one or more embodiments of the invention, the test cases are updated by identifying modifications to test cases by reviewers. For example, when a reviewer is reviewing pre-commit code, test cases for the pre-commit code may be presented to the reviewer. The reviewer may modify the test cases to tailor them to the changes intended to be incorporated into the product based on the pre-commit code. Such modifications by the reviewer may be obtained by searching the product correlated reporting data that is indexed based on the review cycle data. The modifications to the test cases by the reviewer may be used to update the test cases, e.g., adding a new test case corresponding to the modified test case and adding appropriate associations to types of pre-commit code, so that when similar pre-commit code is submitted for review in the future, the future test cases will be available for testing the pre-commit code. By doing so, the test cases may be periodically updated to enable more rigorous and/or tailored testing of pre-commit code.

In step 348, global test plans are updated using the review cycle data indexed product correlated reporting data.

In one or more embodiments of the invention, the global test plans are updated by identifying frequent modifications to test cases by reviewers. For example, when multiple portions of pre-commit code are reviewed, a common modification made to test plans for the pre-commit code may be identified. If the common modifications exceed a predetermined number, the global test plans may be modified based on the common modification. The common modification may be the addition of a test case to the test plan, removal of a test case from the test plan, etc. By doing so, the global test plans may be periodically updated to improve consistency of the automatically generated test plans with reviewer expectations.

The method may end following step 348.

In one or more embodiments of the invention, a learning algorithm is used to update the code base test plan generation rules, the test cases, and/or the global test plans in steps 344, 346, and/or 348. The learning algorithm may be, for example, a machine learning algorithm.

The learning algorithm may be used to correlate test plans used to test pre-commit code to whether the test plans were able to identify whether the pre-commit code is satisfactory. For example, when a test plan is performed, it may not successfully test the pre-commit code. The learning algorithm may be trained using the historical results of testing pre-commit code, the test plans, and characteristics of the pre-commit code on which the test plans were used for testing. Once trained, the learning algorithm may be used to predict whether a test plan will successfully test pre-commit code.

If the learning algorithm suggests that the test plan will not successfully test the pre-commit code, the test plan may be automatically modified by adding, removing and/or modifying test cases to generate a modified test plan. The modified test plan may then be subjected to the learning algorithm. The aforementioned process may be repeated until the learning algorithm suggests that the test plan will successfully test the pre-commit code. The resulting modified test plan may then be used to update the code base test plan generation rules, the test cases, and/or the global test plans.

After code reviews and code is committed via the method illustrated in FIG. 3.1, information regarding the reviewing process may be used to provide feedback to developers based on their previously submitted code. For example, common errors of the developer may be identified using information regarding previous review of their submitted code. FIG. 3.3 shows a flowchart of a method in accordance with one or more embodiments of the invention. The method depicted in FIG. 3.3 may be used to improve software development in accordance with one or more embodiments of the invention by facilitating the review of previously submitted code by a developer. The method shown in FIG. 3.3 may be performed by, for example, a software development manager (e.g., 102, FIG. 1). Other components of the system illustrated in FIG. 1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 360, a code review request for a user is obtained.

In one or more embodiments of the invention, the code review request is obtained from a supervisor of the user. The user may be, for example, a software developer. The code review request may be obtained from other entities without departing from the invention. For example, a software developer may send the code review request.

In step 362, reporting data and/or reviewing cycle data are filtered based on the user. Filtering the reporting data and/or the reviewing cycle may provide a code submission history associated with the user. The code submission history may include information regarding pre-commit code that the user submitted for review, information regarding reviewing of the user's pre-commit code, and information regarding the results of the review of the user's pre-commit code.

In step 364, a code review graphical user interface that is based on the code submission history is displayed. The code review graphical user interface may be similar to the graphic user interface illustrated in FIG. 4.2.

In one or more embodiments of the invention, the code review graphic user interface includes graphical representations of information relating to previous code submissions by the user. For example, the code review graphic user interface may display commonalities between one or more code submissions that were not accepted for commitment. By doing so, habits of the user may be identified. The identified habits of the user may be used to modify future code generated by the user to improve the likelihood of the user's pre-commit code being committed. For example, the identified habits may be used to bring attention to the common mistakes of the user and may result in the user improving future submitted code.

In step 366, user input associated with a graphical element of the code review graphic user interface is obtained.

In one or more embodiments of the invention, the user input is a selection of the graphical element. For example, the graphical element may be selected to indicate that additional information regarding the data represented by the graphical element should be added to the code review graphic user interface.

In one or more embodiments of the invention, the user input is the submission of data via the graphical element. For example, the graphical element may be a field for receiving input from the user. The user may enter information into the field to submit the data. The data may be used to further refine the code review graphic user interface.

For example, the data submitted by the user may be used to select a portion of the code submission history for addition to the code review graphic user interface. The addition may be to add one or more additional graphic elements that represent all, or portion, of the selected portion of the code submission history. The code submission history may be, for example, filtered using the data resulting in identification of the portion of the code submission history. In response to the identification of the portion of the code submission history, additional graphical elements may be added to the code review graphic user interface.

In another example, the data submitted by multiple users may be used to identify best coding, reviewing, and testing practices. Such identifications may be made by visualizing selected portions of the data.

In step 368, an updated code review graphic user interface based on the user input is displayed.

The updated code review graphic user interface may, for example, include additional, different, and/or fewer graphical representations of the code submission history associated with the user then were present in the original code review graphic user interface.

The method may end following step 368.

As discussed above, graphical user interfaces may be utilized when performing the methods illustrated in FIGS. 3.1-3.2. FIGS. 4.1-4.2 show diagrams of graphical user interfaces in accordance with one or more embodiments of the invention.

FIG. 4.1 shows a diagram of an example pre-commit analysis graphic user interface (400) in accordance with one or more embodiments of the invention. As discussed above, the example pre-commit analysis graphic user interface may be displayed to a reviewer during a review of pre-commit code. Additionally, the example pre-commit analysis graphic user interface (400) may be used to obtain reviewer feedback. The reviewer feedback to be used to update information used to generate the example pre-commit analysis graphic user interface (400). In other words, each of the portions of the example pre-commit analysis graphic user interface (400) may be associated with corresponding portions of data. The reviewer may modify any of the portions of the example pre-commit analysis graphic user interface (400). In response, the corresponding information may be updated based on the modification by the reviewer.

Additionally, whenever a pre-commit analysis graphic user interface is generated, information regarding the generated graphic user interface, use of the interface by a reviewer, and/or the outcome of the pre-commit code review may be stored for future use. For example, such information to be stored as part of review cycle data (212.6, FIG. 2.2).

The example pre-commit analysis graphic user interface (400) may include a commit impact information graphic element (410) and a test information graphic element (430). The commit impact information graphic element (410) may be a portion of the example pre-commit analysis graphic user interface (400) that displays a representation of the commit impact information associated with pre-commit code that is being reviewed. The representation may be, for example, a table that includes the commit impact information.

The commit impact information graphic element (410) include an identifiers area (412) and the values area (420). The identifiers area (412) may include any number of identifiers (e.g. 414, 416) of any of the portions of the commit impact information. The identifiers area (412) may also include a fill field (418).

The fill field (418) may enable the user of the example pre-commit analysis graphic user interface (400) to provide user feedback by submitting data. For example, the fill field (418) may be used to add additional information to the commit impact information. Once added, a new identifier may be added the identifiers area (412) corresponding to the added information. A value for the new information may be added via a second fill field (e.g., 426).

The values area (420) may include any number of values (e.g. 422, 424) of any of the portions of the commit impact information. Thus, the portions of the commit impact information and the corresponding values may be displayed via the identifiers area (412) the values area (420).

The test information graphic element (430) may be a portion of the example pre-commit analysis graphic user interface (400) that displays representation of the test information associated with the pre-commit code that is being reviewed. The representation may be, for example, a table that includes the test information.

The test information graphic element (430) include an identifiers area (432) and the values area (440). The identifiers area (432) may include any number of identifiers (e.g. 434, 436) of any of the portions of the commit impact information. The identifiers area (432) may also include a fill field (438).

The fill field (438) may enable the user of the example pre-commit analysis graphic user interface (400) to provide user feedback by submitting data. For example, the fill field (438) may be used to add additional information to the commit impact information. Once added, a new identifier may be added the identifiers area (432) corresponding to the added information. A value for the new information may be added via a second fill field (e.g., 446).

The values area (440) may include any number of values (e.g. 442, 444) of any of the portions of the test information. Thus, the portions of the test information and the corresponding values may be displayed via the identifiers area (432) the values area (440).

In addition to enabling a reviewer to provide feedback via the fill fields, any of the portions of the identifier areas and the values areas may be receptive to input from reviewer. For example, in response to the selection of any of the portions of these areas, user input may be solicited from the reviewer. The user input may be used to update the corresponding data upon which the portions of these areas is based.

FIG. 4.2 shows a diagram of an example code review graphical user interface (460). As discussed above, the example code review graphical user interface (460) may be used to display information regarding previous submissions of code review. For example, the example code review graphical user interface (460) may be used to display commonalities between previous code submissions.

In one or more embodiments of the invention, the example code review graphical user interface (460) includes a filtered value graphical element (462). The filtered value graphical element (462) may be a portion of the example code review graphical user interface (460) used to display information regarding code submissions that include commonality between the code submissions. For example, the filtered value graphical element (462) may be used to display any number of pre-commit identifiers (e.g., 464, 466) of prior code submissions for which a commonality has been identified. The commonality may be, for example, that each of the code submissions identified by the pre-commit identifiers (e.g., 464, 466) were not committed. The commonality may be other types of commonalities between any number of code submissions without departing from the invention.

In one or more embodiments of the invention, the example code review graphical user interface (460) includes any number of graphical elements representing values (e.g., 468, 470). The graphical elements of values may be used to display portions of the commit impact information associated with the code submissions identified by the pre-commit identifiers (e.g., 464, 466).

Each of the graphic elements of values (e.g., 468, 470) may be dynamically generated. For example, all of the commit impact information and testing information associated with the code submissions identified by the pre-commit identifiers (e.g., 464, 466) may be browsable via the example code review graphical user interface (460), selectable via the browsing, and, after selection graphical elements for the values corresponding to the selections made via the browsing may be generated and added to the example code review graphical user interface (460). The aforementioned process may be repeated to update the graphical elements for the values being displayed in the example code review graphical user interface (460).

By generating the example code review graphical user interface (460) and displaying it to an individual, information that is helpful for improving the coding habits, reviewing habits, and/or other types of habits may be provided to the individual. Additionally, such information may be helpful for administrators for identifying individuals that may need additional assistance. For example, software developers that frequently submit code that is unlikely to be committed may be identified and/or habits of the software developers that correlate with the unlikeliness of commitment of the code may be identified.

To further clarify embodiments of the invention, a non-limiting example is provided in FIGS. 5.1-5.5. Each of these figures may illustrate a system and/or data of the system similar to that illustrated in FIG. 1 at different points in times. For the sake of brevity, only a limited number of components of the system of FIG. 1 are illustrated in each of FIGS. 5.1-5.5.

Example

Consider a scenario as illustrated in FIG. 5.1 in which a software developer has submitted pre-commit code (512) for commitment to a code base. Once submitted, the pre-commit code (512) is stored in persistent storage (510) of a data processing device (500). To determine whether the pre-commit code (512) should be committed, the pre-commit code (512) is compared to the committed code (514) to generate dependency data. Once generated, the dependency data is stored as part of review information (516) associated with the committed code (514).

After generating the dependency data, test information is also generated and stored as part of the review information (516). The test information is generated by analyzing the pre-commit code (512) using the defined rules that specify the types of test cases will be used to test the pre-commit code (512). Additionally, an estimate for the duration of the testing is generated based on the test information. The estimate for the duration is generated based on heuristically obtained information regarding previous testing of previous code submission.

FIG. 5.2 shows the review information (516). As seen, the review information (516) includes a listing of the file names of the commit code (514) impacted by the pre-commit code (512), a listing of the functions of the commit code (514) impacted by the pre-commit code (512), a listing of the binaries and libraries of the commit code (514) impacted by the pre-commit code (512), a listing of the test cases that will be used to test each of the impacted portions of the committed code (514), and a duration estimate for each of the test cases.

For example, for file b.c, test case t13 will be used for its testing and it is estimated to take 3 hours to perform the testing. Additionally, function Fn4{ } and binary c.exe is impacted by the changes to file b.c that committing the pre-commit code (512) would have on the committed code (514).

Prior to testing, a pre-commit analysis graphical user interface (550), as illustrated in FIG. 5.3, is generated and displayed to the reviewer. The pre-commit analysis graphical user interface (550) includes both of a commit impact information graphical element (552) and a test information graphical element (554) that are based on the review information (516).

When displayed to the reviewer, the reviewer disagrees with the use of test 5 for testing purposes and believes that test 4 should be used in place of test 5. Using the pre-commit analysis graphical user interface (550), the user selects the portion of the test information graphical element (554) associated with test 5 and provides data indicating that test 4 should be used.

Upon receipt of the data, a second pre-commit analysis graphical user interface (560) is generated and displayed to the reviewer, as illustrated in FIG. 5.4. The second pre-commit analysis graphical user interface (560) includes an updated test information graphical element (564) reflecting that test 4, rather than test 5, will be used for testing purposes. As seen from FIG. 5.4, test for is estimated to take 6 hours rather than the 4 hours that were estimated to complete test 5. This is because test 4 is a more rigorous test which the reviewer believed was required for proper testing of the pre-commit code (512).

Using the obtained user input, the review information (516) was updated as illustrated in FIG. 5.5 to reflect the new testing that will be performed and the corresponding test time estimation. By doing so, reviewer feedback on the automated processes for generating test plans and performance of such testing may be obtained. Such reviewer feedback may be used to further refine the rules for generating test plans to improve the review of future code submissions automatically.

End of Example

Figure 6:
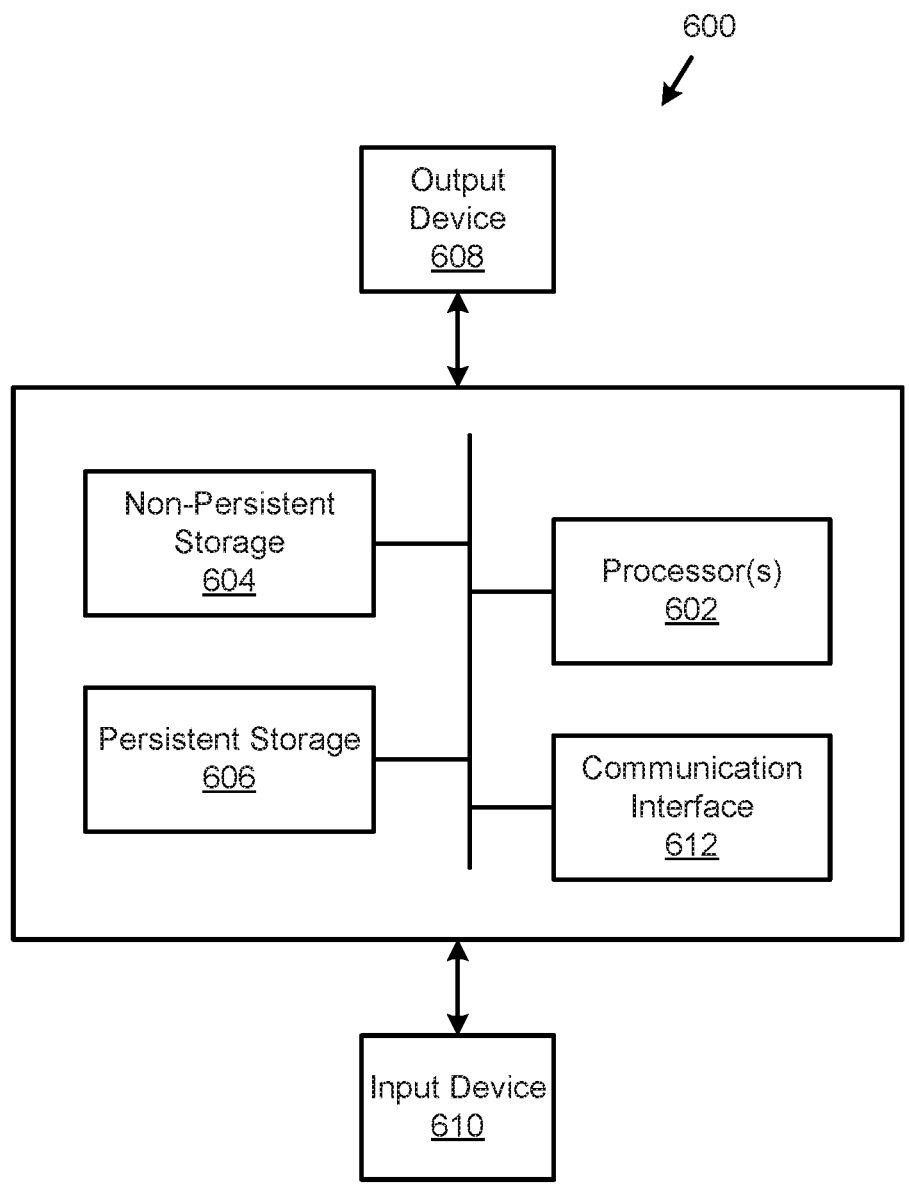
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide a system for reviewing of pre-commit code. The system may automatically generate a plan for testing the pre-commit code and solicit feedback from a reviewer on the plan for testing the pre-commit code. The reviewer feedback may be used to both update the plan for testing as well as better tailor rules for automatically generating test plans. By doing so, a system in accordance with embodiments of the invention may be continuously refined for providing automated reviewing of pre-commit code.

Thus, embodiments of the invention may address the problem of limited available resources for reviewing of pre-commit code. For example, there may be a limited number of individuals with sufficient skill to review pre-commit code. To improve the review process, the pre-commit code may be automatically analyzed to determine information that may be used by a reviewer to efficiently diagnose potential issues with the pre-commit code. Consequently, embodiments of the invention may reduce a cognitive burden on reviewers.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data processing device, comprising:
    persistent storage for storing a code repository; and
    a computer processor programmed to:
        generate commit impact information based on:
            pre-commit code for a code base stored in the code repository, and
            dependency data based on committed code of the code base;
        display a pre-commit analysis graphic user interface (GUI) reflecting the commit impact information and testing information for the pre-commit code;
        obtain, using the displayed pre-commit analysis GUI, reviewer feedback regarding approval of the pre-commit code;
        make a determination, based on the reviewer feedback, that the pre-commit code has been approved;
        in response to the determination:
            perform limited testing of the code base based upon the dependency data to obtain testing results; and
            commit the pre-commit code to the committed code when the testing results match a predetermined behavior.

2. The data processing device of claim 1, wherein the pre-commit code is not committed to the committed code when the testing results match a second predetermined behavior.

3. The data processing device of claim 1, wherein the pre-commit analysis GUI comprises:
    a first graphical element representing the commit impact information; and
    a second graphical element representing the test information.

4. The data processing device of claim 1, wherein the commit impact information specifies:
    a modification of the committed code that would be caused by updating the committed code using the pre-commit code;
    a modification of a function that would be caused by updating the committed code using the pre-commit code;
    a modification of a module that would be caused by updating the committed code using the pre-commit code;
    a modification of a component that would be caused by updating the committed code using the pre-commit code; and
    a modification of an interdependent component that would be caused by updating the committed code using the pre-commit code.

5. The data processing device of claim 1, wherein the commit impact information specifies:
    a modification of a library that would be caused by updating the committed code using the pre-commit code; and a modification of a binary that would be caused by updating the committed code using the pre-commit code.

6. The data processing device of claim 1, wherein the test information specifies:
   a test that will be performed as part of the limited testing of the code base; and
   an estimate of a duration of the limited testing of the code base.

7. The data processing device of claim 1, wherein performing the limited testing of the code base does not include generation of executables for a portion of the code base that would not be impacted by updating the committed code using the pre-commit code.

8. The data processing device of claim 7, wherein performing the limited testing of the code base is automated.

9. The data processing device of claim 7, wherein performing the limited testing of the code base comprises:
   generating a binary based on:
      a portion of the pre-commit code, and
      a portion of the committed code;
   deploying the binary to an image associated with the code base to obtain an updated image; and
   simulating a workload on the image based on a test case to obtain a portion of the testing results.

10. The data processing device of claim 1, wherein obtaining, using the displayed pre-commit analysis GUI, the reviewer feedback regarding approval of the pre-commit code comprises:
    obtaining first user input associated with the commit impact information;
    updating the commit impact information using the first user input; and
    obtaining second user input that indicates the reviewer feedback.

11. A method for managing a code repository, comprising:
    generating commit impact information based on:
       pre-commit code for a code base stored in the code repository, and
       dependency data based on committed code of the code base;
    displaying a pre-commit analysis graphic user interface (GUI) reflecting the commit impact information and testing information for the pre-commit code;
    obtaining, using the displayed pre-commit analysis GUI, reviewer feedback regarding approval of the pre-commit code;
    making a determination, based on the reviewer feedback, that the pre-commit code has been approved;
    in response to the determination:
       performing limited testing of the code base based upon the dependency data to obtain testing results; and
       committing the pre-commit code to the committed code when the testing results match a predetermined behavior.

12. The method of claim 11, wherein the pre-commit code is not committed to the committed code when the testing results match a second predetermined behavior.

13. The method of claim 11, wherein the pre-commit analysis GUI comprises:
    a first graphical element representing the commit impact information; and
    a second graphical element representing the test information.

14. The method of claim 11, wherein the commit impact information specifies:
    a modification of the committed code that would be caused by updating the committed code using the pre-commit code;
    a modification of a function that would be caused by updating the committed code using the pre-commit code;
    a modification of a module that would be caused by updating the committed code using the pre-commit code;
    a modification of a component that would be caused by updating the committed code using the pre-commit code; and
    a modification of an interdependent component that would be caused by updating the committed code using the pre-commit code.

15. The method of claim 11, wherein the commit impact information specifies:
    a modification of a library that would be caused by updating the committed code using the pre-commit code; and
    a modification of a binary that would be caused by updating the committed code using the pre-commit code.

16. A non-transitory computer readable medium comprising computer readable program code, which when executed by a computer processor enables the computer processor to perform a method for managing a code repository, the method comprising:
    generating commit impact information based on:
       pre-commit code for a code base stored in the code repository, and
       dependency data based on committed code of the code base;
    displaying a pre-commit analysis graphic user interface (GUI) reflecting the commit impact information and testing information for the pre-commit code;
    obtaining, using the displayed pre-commit analysis GUI, reviewer feedback regarding approval of the pre-commit code;
    making a determination, based on the reviewer feedback, that the pre-commit code has been approved;
    in response to the determination:
       performing limited testing of the code base based upon the dependency data to obtain testing results; and
       committing the pre-commit code to the committed code when the testing results match a predetermined behavior.

17. The non-transitory computer readable medium of claim 16, wherein the pre-commit code is not committed to the committed code when the testing results match a second predetermined behavior.

18. The non-transitory computer readable medium of claim 16, wherein the pre-commit analysis GUI comprises:
    a first graphical element representing the commit impact information; and
    a second graphical element representing the test information.

19. The non-transitory computer readable medium of claim 16, wherein the commit impact information specifies:
    a modification of the committed code that would be caused by updating the committed code using the pre-commit code;
    a modification of a function that would be caused by updating the committed code using the pre-commit code;

a modification of a module that would be caused by updating the committed code using the pre-commit code;

a modification of a component that would be caused by updating the committed code using the pre-commit code; and a modification of an interdependent component that would be caused by updating the committed code using the pre-commit code.

20. The non-transitory computer readable medium of claim 16, wherein the commit impact information specifies:

a modification of a library that would be caused by updating the committed code using the pre-commit code; and a modification of a binary that would be caused by updating the committed code using the pre-commit code.

\* \* \* \* \*